UNITED STATES PATENT OFFICE.

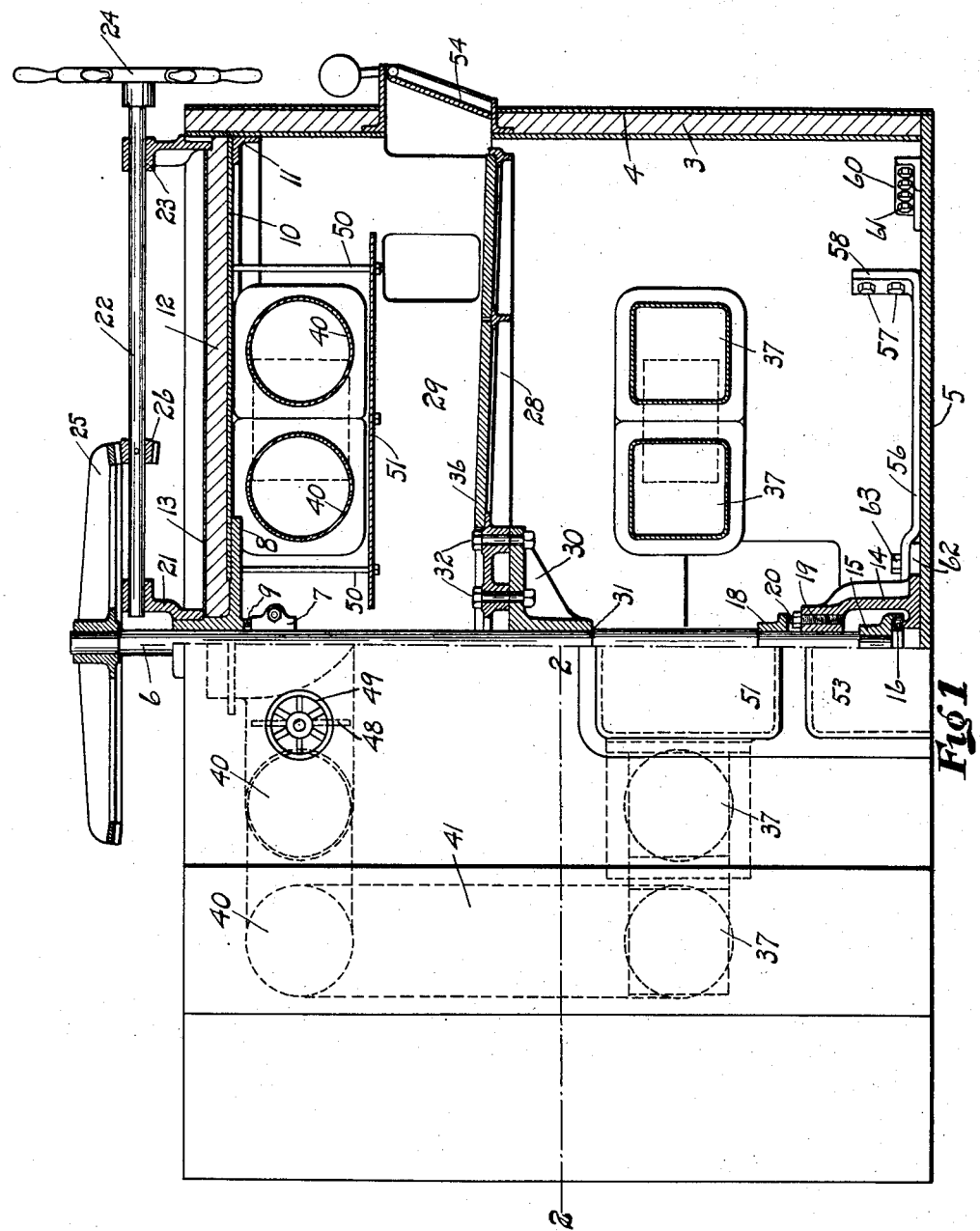

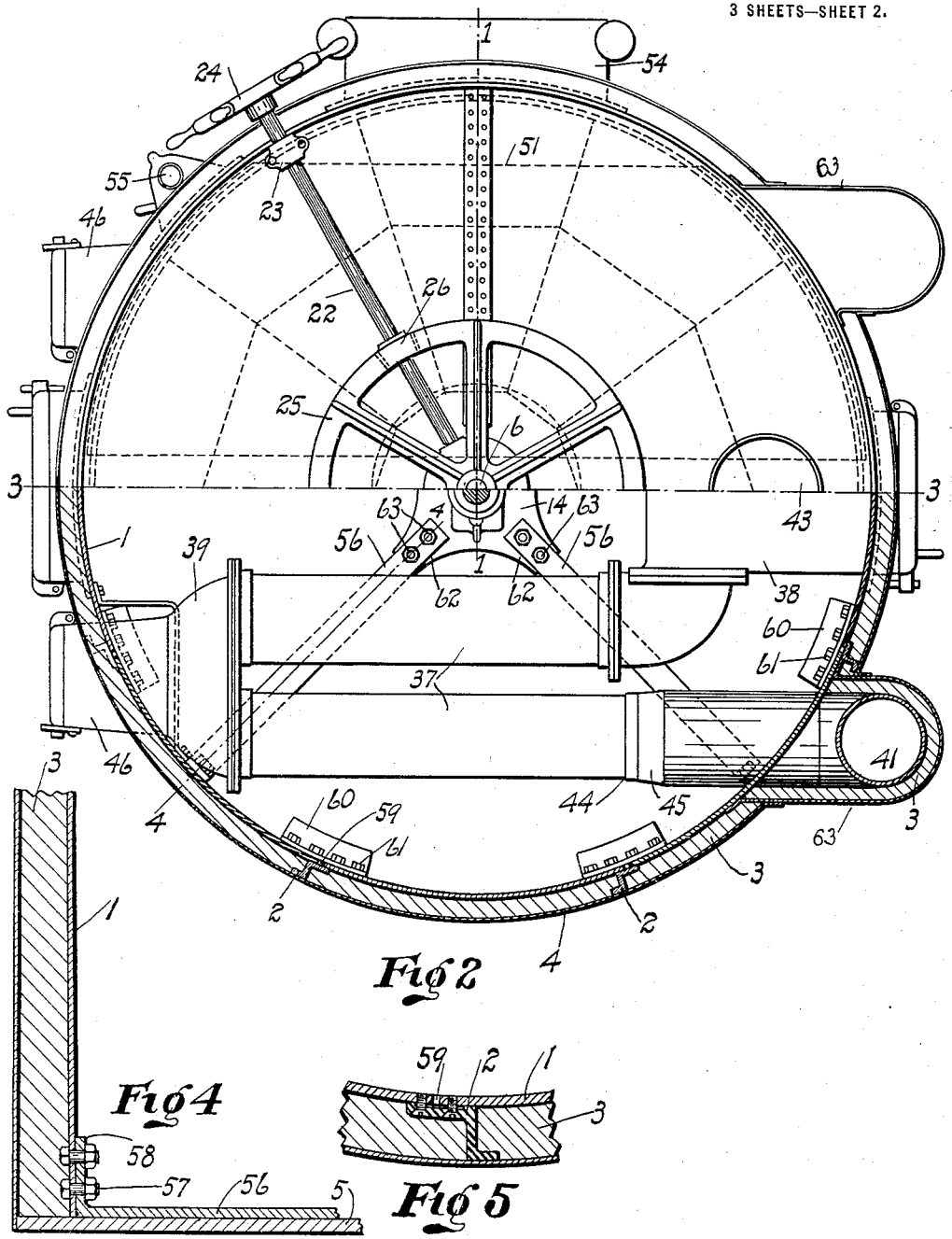

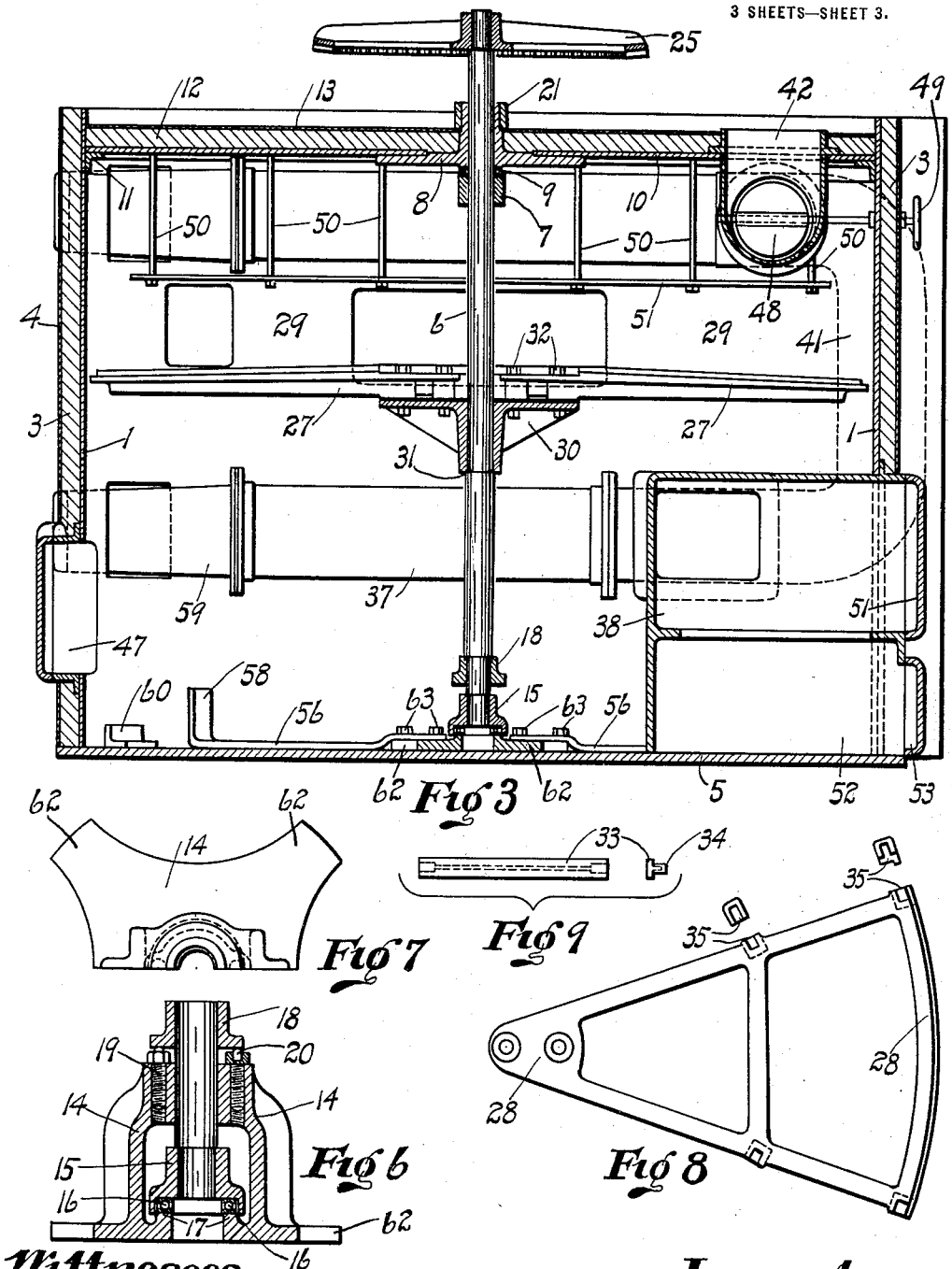

EMIL CLAUSS, OF CINCINNATI, OHIO.

BAKE-OVEN.

1,159,747.   Specification of Letters Patent.   Patented Nov. 9, 1915.

Application filed February 12, 1915. Serial No. 7,864.

*To all whom it may concern:*

Be it known that I, EMIL CLAUSS, a citizen of the United States, residing at the city of Cincinnati, in the county of Hamilton and State of Ohio, have invented certain new and useful Improvements in Bake-Ovens, of which the following is a specification.

This invention relates more particularly to rotary bake ovens, that is, an oven having a rotary baking plane on which the goods are baked, and has for its object to provide an oven in which the heat is evenly distributed and in which a maximum amount of baking can be done with a minimum amount of heat, and so that the baking will be done in a quick, thorough and uniform manner throughout the entire baking surface of the oven. Ovens of this type or character are usually made entirely or mostly of brick, mortar, concrete, stone and like material and permanently attached to the premises or bakery where they are located or used and thus are a permanent fixture of the establishment or bakery. These ovens are bulky and weighty and cannot be moved, but must be destroyed or allowed to fall into decay when they are abandoned or the bakery or establishment is moved or the interior of the bakery is changed, thus entailing loss, wasting space, and become a burden to the premises, especially if said premises are not again to be used as a bakery. It takes a great deal of time to heat this class of ovens and it is hard to uniformly heat them on account of the heat being carried and maintained in the earthenware products out of which they are usually constructed. I overcome all these defects and objections and produce an oven of the rotary type which is cheap of manufacture, simple in construction and highly efficient in use.

My new rotary oven is made of vertical sectional plates of metal joined at their meeting edges to form a double peripheral oven wall spaced to receive a non-heat conducting substance; has a roof or top of similar construction and a metal bottom, a metal framework rotary baking plane, double sets of upper and lower metal flues and other arrangement and combination of metal parts and connections to render the same highly portable, as it can be knocked down. Its various features and advantages will readily become apparent from the following specification.

My oven can be put up in parts or sections, made of metal, and when completed it will be permanent and solid for baking purposes and when it is desired to remove the same to any other part of the bakery or to another outside location it can just as easily and readily be taken down or dismantled and moved to the new location and then reconstructed, again assuming its original construction and contour and high efficiency as a baking machine.

It is well known and perfectly apparent that when the old style ovens get out of order, they must often be stopped for a long time on account of time taken to remove brick and mortar and the like and time to replace, the repairs being costly and highly inconvenient. If anything in my oven should get out of order, or impaired by use, it can be ordered and replaced in a few hours, as each part fits, as the parts for each part of the oven are complementary.

The other features and advantages of the invention will readily become apparent from the following specification.

In the accompanying drawing forming part of this specification, Figure 1, is a general view of the oven, partly in section on the line 1—1 of Fig. 2, and partly in elevation, Fig. 2, is a plan view, partly in section and partly in elevation, the section being on the line 2—2 of Fig. 1, Fig. 3 is a sectional view, taken on the line 3—3 of Fig. 2, the shaft and rotary baking plane not being in section, Fig. 4, is a sectional view taken on the line 4—4 of Fig. 2, Fig. 5, is a sectional view of one of the Z-bars and parts they connect, Fig. 6, is a sectional view of the step bearing support for the central shaft which supports the rotary baking plane, Fig. 7, is a half-plan of the parts shown in Fig. 6, Fig. 8, is a plan view of one of the sections which form the rotary baking plane, and Fig. 9, is a plan and an end view of the link bar used in forming the sections into a rotary baking plane.

The body of the rotary oven is made up of a series of upright metal plates or sections 1, each forming part of a circle, so that when together they form a circular or annular iron framework. The plates 1 at their juncture are held together and supported by Z-bars 2, bolted or riveted in position. I may use as many of these plates as I find convenient and desirable and may make them of any form or contour and connect them together in any desirable manner. Around the outside of these plates 1, after they have been erected, I place an asbestos covering 3, which, may be made of any kind of insulating material, so as to retain the heat in the oven, and around this asbestos covering 3 I place a shell or lagging 4; the Z-bars also assisting in holding or retaining the asbestos where they are used.

The frame work or oven body rests on a metal bottom 5, attached thereto in any desirable manner, preferably by angle plate 60 held in place by bolts 61 at the joints 59 between the plates.

A central shaft 6 on which the rotary baking plane revolves, carries near its top a collar 7, which supports a disk hub 8 through the agency of a ball race or bearing 9. Upon the outer edge of the disk hub 8 I place the inner part of a ring or plate 10 and at its periphery connect said plate to the plates 1, resting it on a rim 11; I then place an asbestos covering 12 on this plate, a metal sheet or disk 13 covering the asbestos 12, the plate 13 being connected to the plates 1 in any desirable manner at its outer edge; these plates 10 and 13 and asbestos 12 form the top of the oven.

The central shaft 6 is supported at the bottom in a step bearing resting on the bottom 5 of the oven, and is composed, principally, of a housing 14 in which is placed a collar 15, into which the shaft 6 passes and is supported, a series of balls 16 being placed between the bottom of said collar and a rim 17 of the housing 14, thus forming a ball bearing so that the shaft 6 carrying the baking plane will revolve readily and with little friction. On the shaft above the housing I place an adjustable collar 18, which is regulated through the agency of the adjustment screws 19. By raising the screws 19, the collar 18 is forced upward, causing shaft 6 and its connections to move upward with it, so that the housing and its contents can be reached. In order to accomplish this in a thorough way, I place steel pins as 20 in the top of the adjustment screws 19, (see Fig. 6).

The shaft 6 passes upward through the oven and near its top carries the collar 7 and passes through the disk hub 8 which partly forms a bearing for the arm 21, (see Fig. 1), and also for a pinion shaft 22, and at its outer end said shaft 22 is supported in a bearing 23 and carries a hand wheel 24. At the upper extremity of shaft 6, I place a large gear wheel 25 which meshes with a pinion 26 on shaft 22.

At a suitable point in the oven, as to height, I place, on the shaft 6, a rotary baking plane 27, formed of a series of spider segments 28. The baking plane is supported in the baking chamber 29 on a spider or hub 30, the hub being secured to the shaft on a shoulder 31 and the spider segments 28 are held to the hub 30 by bolt and nut connection 32. In the present instance I use five segments 28, alternately placing between them the rods or link connecting arms 33, the outer one being curved so as to conform to the peripheral edge of the rotary baking plane. These arms 33 have a rib 34 fitting into sockets 35 on the spider segments 28, thus I make a continuous series of spider segments to make up the rotary baking plane. The rotary baking plane, made up of the spider segments is covered with soapstone 36, to be used as the baking surface.

In order to revolve the rotary baking plane 27 the hand wheel 24 is turned, thus turning the shaft 22, turning the pinion 26 which meshes with gear 25, which, being on shaft 6 rigidly, turns said shaft 6, carrying the rotary baking plane around in the baking chamber, the shaft and baking plane operating with little friction by reason of the ball bearing in the step bearing at the bottom.

The oven is heated by a series of lower and upper flues in order to utilize all the products of combustion, the lower flues being situated below the baking plane 27 and are marked 37; they begin at fire box 38, of any modern construction, and extend back toward the rear of oven to a return bend 39 and then continuing and extending forward to the outside of the oven (see particularly Fig. 2), where they return upward to form the upper flues 40, which lie above the rotary baking plane 27; the flue part which connects the lower and upper flues being marked 41 (see Figs. 1 and 2); the upper flues 40 pass over the same course as the lower flues 37 and then run over and connect to the smoke stack 42 at the point 43. The lower flues are square or angular in contour and the upper flues cylindrical; these flues are made of metal and may be of any desired shape or contour, preferably however, as shown. It will be seen that these flues are double and are in sets, one set on each side of the oven, both below and above the rotary baking plane. Of course I may have the flues travel over any course desirable for proper and effective distribution of heat and for the utilization of all products of combustion, preferring however to use them as shown and explained. At the point 44, where the square flues 37 are merged into the cylindrical flues 40, I place a reducer 45, (see Fig. 2). This reducer is used to change the contour of the flues and when desired to change the size of the upper or lower flues, thus rendering the flues capable of regulation as to size so that coal, wood, natural gas or other fuel may be properly and economically used. The flues at the front of the oven extend beyond the peripheral wall of the oven, as stated, so that they can be readily reached for repair and to make the oven wall stronger.

The flues, at the connecting or return bend 39 are provided with clean out doors 46. These doors preferably extend out beyond the oven wall so as to readily and conveniently reach the flues for cleaning and repair purposes. A clean out door 47 is also placed in the oven wall so that the lower compartment can be reached for any purpose. I may use any kind of ordinary dampers and place them in any point in the flues, in the present instance I use dampers 48, operated through small wheel 49.

From the top disk 10, I place depending arms 50, to which I connect or suspend at each side of the oven, under the upper flues 40, plates 51; these plates are metal and are used to uniformly radiate the heat throughout the baking chamber 29. These plates may be of any size and shape and suspended in any desirable manner.

The fire box 38 is closed by a door 51 of any suitable construction, and near the fire box is the ash pit 52, closed by a door 53. The baking chamber 29 and the rotary baking plane 27 are reached through the door 54, of a form usually employed in bake ovens of this class. The goods to be baked and the baked products are placed in and taken out through this door by hand or with a baker's peel. I also place a lamp 55, so that the inside of the oven can be seen from the outside.

In installing the oven, I preferably put up four of the plates 1, that is the ones which I connect through agency of the arms 56, which reach from the plates to which they are connected by nut and bolt connection 57 over to the short arms 62 on the housing 14 to which they are attached by bolt and nut connection 63; preferably, however, placing them on the bottom 5 which I put in position first. This will leave spaces between the plates. I can then put in all the interior work of the oven and then fill the alternate spaces with the plates which have no arm connection with the housing and then fasten them all down with the angle plates 60 and bolt connection 61 and after the Z-bars are connected in place the asbestos and outside lagging can readily be put in place and the roof of the oven constructed; in other words, inasmuch, as all the parts are riveted and bolted together and interlock, it will readily be seen how the oven can be built and also taken down and rebuilt.

At the point where the flues extend outside of the oven the asbestos covering and the plate surrounding it is shaped to conform to the contour of the flues, the plate in this instance being marked 63 and they may be connected to the oven frame in any desired manner, (see Fig. 2).

By my construction the baking chamber is uniformly heated and therefore the bread or other articles to be baked are exposed to the heat in the baking chamber in a thorough and uniform way, whereby the operation of baking is greatly facilitated and the result much improved.

From the above description it will be seen that the improved bake oven, constructed according to my invention, is of an extremely simple and inexpensive nature, and is especially well adapted for the purposes for which it is designed, and it will also be obvious from the above description that the bake oven is capable of considerable modification without material departure from the principle and spirit of the invention, and for this reason I do not wish to be understood as limiting myself to the precise form and arrangement of the several parts of the device as herein set forth in carrying out my invention in practice.

While I have shown that the rotary baking plane is operated by hand, it is evident that it may be operated by an electric motor or by any other power.

What I claim as new and my invention and desire to secure by Letters Patent is:

1. In an oven of the class described, an inner and an outer metal casing spaced apart and formed of a number of metal plates suitably joined together, a non-heat conducting material in the space between the casings, radial arms extending from the center of the oven to the inner casing to support the metal framework of the oven, a top and a bottom for the oven, a baking chamber therefor, a rotary baking plane in said oven, and means for revolving the same, two sets of flues disposed at each side of the oven, and extending both below and over the rotary baking plane in the baking chamber, and heat radiating metal plates suspended from the top of the oven between the upper flues and the top of the rotary baking plane.

2. In an oven of the class described, an inner and an outer spaced casing making the body of the oven, said casings made up of a series of vertical metal plates suitably joined together at their meeting edges, the space between the casings filled with a non-heat conducting substance, a roof and a bottom for said oven, radial arms extending from the oven wall to the center of the oven to form supports, a baking chamber therein, a vertical shaft in said oven stepped in the bottom and passing up through the baking chamber, a rotary baking plane supported on said shaft, and means for revolving said baking plane, a double set of metal flues disposed at each side of the oven and extending both below and above the rotary baking plane, the lower flues being square and the upper flues cylindrical, and a reducer at the point where the square flues merge into the cylindrical flues, said flues at the front of the oven extending out beyond the wall of the oven, and metal heat radiating plates suspended from the top of the oven between the upper flues and baking plane, all made of parts rendering the oven knock down and portable.

3. In an oven of the class described, an inner and an outer metal casing spaced apart and formed of a number of metal plates suitably joined together, a non-heat conducting material in the space between the casings, a top and a bottom for the oven, and means for connecting these parts together to form a body for the oven, a rotary baking plane in said oven, and means for supporting and revolving the same, double sets of metal flues disposed at each side of the oven and extending in double sets both below and above the rotary baking plane, all the parts forming the oven and flues and rotary baking plane made of sectional metal pieces, and means for connecting and disconnecting them to render the oven knock down and portable.

EMIL CLAUSS.

Witnesses:
H. E. CARSTENS,
L. M. DUNLAP.

Copies of this patent may be obtained for five cents each, by addressing the "Commissioner of Patents, Washington, D. C."